(12) United States Patent  
Skinner et al.

(10) Patent No.: US 12,246,407 B2  
(45) Date of Patent: Mar. 11, 2025

(54) MACHINE TOOLS AND METHODS OF OPERATION THEREOF

(71) Applicant: Fives Landis Limited, Keighley (GB)

(72) Inventors: Michael D. Skinner, Skipton (GB); Daniel P. Turner, Skipton (GB)

(73) Assignee: Fives Landis Limited, Keighley (GB)

( * ) Notice: Subject to any disclaimer, the term of this patent is extended or adjusted under 35 U.S.C. 154(b) by 1283 days.

(21) Appl. No.: 16/765,098

(22) PCT Filed: Feb. 26, 2018

(86) PCT No.: PCT/GB2018/050488  
§ 371 (c)(1),  
(2) Date: May 18, 2020

(87) PCT Pub. No.: WO2019/115985  
PCT Pub. Date: Jun. 20, 2019

(65) Prior Publication Data  
US 2021/0283740 A1 Sep. 16, 2021

(30) Foreign Application Priority Data

Dec. 12, 2017 (GB) .................................... 1720678

(51) Int. Cl.  
*B24B 19/12* (2006.01)  
*B23B 5/18* (2006.01)  
(Continued)

(52) U.S. Cl.  
CPC .............. *B24B 19/125* (2013.01); *B23B 5/18* (2013.01); *G05B 19/184* (2013.01);  
(Continued)

(58) Field of Classification Search  
None  
See application file for complete search history.

(56) References Cited

U.S. PATENT DOCUMENTS

| | | |
|---|---|---|
| 3,619,581 A | 11/1971 | Kimura et al. |
| 4,400,781 A | 8/1983 | Hotta et al. |

(Continued)

FOREIGN PATENT DOCUMENTS

| | | |
|---|---|---|
| CN | 104155877 A | 11/2014 |
| CN | 105700353 A | 6/2016 |

(Continued)

OTHER PUBLICATIONS

Z.H. Deng, et al. 'A hybrid model using genetic algorithm and neural network for process parameters optimization in NC camshaft grinding, International Journal of Advanced Manufacturing Technology, vol. 45, Apr. 28, 2009, pp. 859-866, (Year: 2009).*

(Continued)

*Primary Examiner* — Ryan A Jarrett  
(74) *Attorney, Agent, or Firm* — Kolitch Romano Dascenzo Gates LLC

(57) ABSTRACT

A machine tool is configured to receive input data defining a profile to be machined onto a workpiece, with the profile defined in a plane perpendicular to an axis of rotation of the workpiece and non-circular in that plane, and calculate using an evolutionary algorithm a workpiece velocity profile corresponding to the velocities at which the workpiece is to be rotated by the workpiece mount over at least part of a (Continued)

rotation of the workpiece during machining. The machine tool then rotates the workpiece according to the workpiece velocity profile during machining of the workpiece.

14 Claims, 8 Drawing Sheets

(51) Int. Cl.
    *G05B 19/18*     (2006.01)
    *G05B 19/416*     (2006.01)

(52) U.S. Cl.
    CPC .... *G05B 19/4163* (2013.01); *B23B 2270/486* (2013.01); *G05B 2219/42147* (2013.01); *G05B 2219/45161* (2013.01)

(56) References Cited

U.S. PATENT DOCUMENTS

| | | | |
|---|---|---|---|
| 4,905,418 | A | 3/1990 | Wedeniwski |
| 5,473,532 | A | 12/1995 | Unno et al. |
| 2008/0255684 | A1 | 10/2008 | Wong et al. |
| 2017/0072527 | A1 | 3/2017 | Krajnik et al. |

FOREIGN PATENT DOCUMENTS

| | | | |
|---|---|---|---|
| EP | 1473113 | A1 | 11/2004 |
| EP | 1814000 | A2 | 8/2007 |
| JP | H 04201063 | A | 7/1992 |
| JP | H 09212218 | A | 8/1997 |

OTHER PUBLICATIONS

Machine-generated English abstract of JPH 04201063 A, downloaded from Google Patents on Apr. 28, 2020.
Machine-generated English translation of JPH 09212218 A, downloaded from Google Patents on Apr. 28, 2020.
Machine-generated English translation of CN 104155877 A, downloaded from the European Patent Office on Apr. 28, 2020.
Machine-generated English translation of CN 105700353 A, downloaded from Google Patents on Apr. 28, 2020.
Brecher, et al., "Local Simulation of the Specific Material Removal Rate for Generating Gear Grinding," Gear Technology, pp. 86-91, Sep./Oct. 2015.
Deng, Z.H, et al., "A hybrid model using genetic algorithm and neural network for process parameters optimization in NC camshaft grinding," International Journal of Advanced Manufacturing Technology, vol. 45, Apr. 28, 2009, pp. 859-866.
Laramee, Francois Dominic, "AI Game Programming Wisdom," Section 11, pp. 629-639 and pp. 670-671, 2002.
Rabin, Steve, ed., "AI Game Programming Wisdom 2," Section 1, p. 18, 2004.
Saravanan, R., et al., "A multi-objective genetic algorithm (GA) approach for optimization of surface grinding operations," International Journal of Machine Tools & Manufacture, vol. 42, No. 12, Sep. 2002, pp. 1327-1334.
Search Report issued in connection with United Kingdom Patent Application No. GB 1720678.0, 1 page, United Kingdom Intellectual Property Office, Jun. 5, 2018.

\* cited by examiner

MACHINE TOOLS AND METHODS OF OPERATION THEREOF

FIELD OF THE DISCLOSURE

The present disclosure relates to machine tools and methods of operation thereof. More particularly, it concerns machine tools for forming a non-circular circumferential surface on a rotating workpiece.

BACKGROUND OF THE DISCLOSURE

A well-known example of a non-circular profile that is formed on a rotating workpiece by machine tools is a cam lobe on a camshaft. Cam profiles are often described by a series of lift values denoting the distance that the cam surface is radially spaced from a "base circle diameter" at a series of angularly defined increments around the cam surface. For example a series of lift values may be set out in a lift table specifying 360 lift values, one for each degree of rotation of the cam.

A machine tool having a grinding wheel may be used to form a desired cam profile on a workpiece by controlling the in-feed position of a grinding wheel as the workpiece rotates about a longitudinal axis. A numerical control system for generating a cam profile on a workpiece is disclosed in U.S. Pat. No. 3,619,581. The location of the point of contact between a non-circular workpiece profile and a circular grinding wheel will circumferentially move around the wheel profile as the workpiece rotates and this needs to be taken into account in determining the in-feed motion of the grinding wheel relative to the workpiece.

The grinding wheel is gradually fed in towards the workpiece so as to approach a target finished profile for the workpiece. The in-feed is achieved in a series of increments getting smaller towards the finished size, ending with one or two turns of the workpiece at the finished size for sparking out. The size of the increments (that is, the "cut depth") determines the rate of material removal, which is kept below a threshold to avoid thermal damage to the workpiece or excessive wear to the grinding wheel. U.S. Pat. No. 4,905,418 describes a process for grinding cams of a camshaft by means of a numerically controlled camshaft grinding machine.

SUMMARY OF THE DISCLOSURE

The present disclosure provides a machine tool for machining a workpiece, the machine tool comprising a tool mount for carrying a tool, a workpiece mount for carrying and rotating a workpiece about an axis of rotation, a drive mechanism for moving at least one of the tool mount and the workpiece mount relative to the other, and a control arrangement for controlling the workpiece mount and the drive mechanism, wherein the machine tool is configured to:
  receive input data in the control arrangement, the input data defining a profile to be machined onto the workpiece, with the profile being defined in a plane perpendicular to the axis of rotation and non-circular in that plane;
  calculate with the control arrangement using an evolutionary algorithm a workpiece velocity profile corresponding to the velocities at which the workpiece is to be rotated by the workpiece mount over at least part of a rotation of the workpiece during machining of the workpiece by a tool mounted in the tool mount; and
  rotate a workpiece with the workpiece mount according to the workpiece velocity profile during machining of the workpiece by a tool mounted in the tool mount.

The workpiece velocity profile is dependent on several parameters and an evolutionary algorithm is particularly beneficial for these circumstances as it is able to determine solutions in a complex search space defined by multiple parameters.

Preferably, the evolutionary algorithm is a genetic algorithm.

According to a preferred example, the evolutionary algorithm generates a population of candidate workpiece velocity profiles and the fitness of each candidate workpiece velocity profile is determined by the control arrangement with reference to the duration of a rotation of the workpiece according to the candidate workpiece velocity profile. The candidates most highly ranked according to the fitness measure or function may then be used by the evolutionary algorithm to generate a further population of candidate workpiece velocity profiles and the fitness of each candidate in the further population may then be determined to identify the most suitable candidates. In this way, the velocity profiles evolve from each population to the next. The evolutionary algorithm is therefore able to explore the search space to find velocity profiles which provide shorter durations for a rotation of the workpiece for a given workpiece profile.

The evolutionary algorithm may seek to determine whether each candidate workpiece velocity profile is acceptable with reference to a set of parameters that define machine operating limits. In an example of the present disclosure, the evolutionary algorithm generates a population of candidate workpiece velocity profiles and a candidate workpiece velocity profile is rejected by the control arrangement if it exceeds a threshold maximum value for at least one of the following machine operating parameters: workpiece rotation velocity, acceleration and jerk; and velocity, acceleration and jerk of relative movement of the tool mount and the workpiece mount by the drive mechanism.

An initial population of candidate workpiece velocity profiles may be generated randomly across the search space. Alternatively, the evolutionary algorithm may be "seeded" by providing a predetermined workpiece velocity profile as a starting point. The predetermined workpiece rotational velocity profile may have a constant velocity value. In other examples, it may be a predetermined velocity profile defining variation of velocity over a partial or complete rotation of a workpiece. The algorithm then makes modifications to the "seed" profile in order to generate new candidate profiles.

The new candidate profiles may be generated using genetic operators such as crossover, mutation, regrouping, colonisation-extinction, or migration for example. In preferred examples, only mutation and crossover techniques are used. More preferably, only mutation is used to generate new candidate profiles as this was found to generate good results relatively quickly.

In a preferred example, the evolutionary algorithm generates a population of candidate workpiece velocity profiles, with each profile comprising a sequence of velocity values representing rotational velocities for a corresponding set of rotational positions of the workpiece. The difference between each velocity value and the adjacent velocity value on each side thereof in the sequence may be restricted by the control arrangement to be within a predetermined range, that is, up to but not exceeding a predetermined difference threshold.

Restriction of the difference between adjacent velocity values may serve to reduce the likelihood of any machine acceleration and jerk limitations being exceeded.

As using an evolutionary algorithm inherently pursues candidate profiles that give improvements, it tends to develop new candidates by focusing changes on regions of the profile where there is greater scope for improvements. These regions may for example be regions where the surface speed may increase, or regions over which the in-feed does not change significantly.

The evolutionary algorithm may generate a velocity profile corresponding to the velocities of relative movement of the tool mount and the workpiece mount by the drive mechanism in association with each of a population of candidate workpiece velocity profiles.

The most highly ranked candidate workpiece velocity profile is then tested to see if the algorithm should be terminated. For example, this may be the case when the most highly ranked candidate (or its fitness) is substantially the same or the same as the most highly ranked candidate (or its fitness) from the previous iteration of the algorithm.

The drive mechanism may be controlled to provide incremental or continuous changes in the in-feed of a tool relative to a workpiece during a machining process.

After a workpiece velocity profile has been calculated, the control arrangement may calculate a maximum cut depth which provides specific material removal rates which are less than or equal to a predetermined maximum specific material removal rate over the calculated workpiece velocity profile. The specific material removal rates may be calculated by the control arrangement using known methods.

Alternatively, or additionally, after a workpiece velocity profile has been calculated, the control arrangement may calculate a maximum cut depth which is determined by the control arrangement to generate workpiece temperatures less than or equal to a predetermined maximum workpiece temperature over the calculated workpiece velocity profile. The workpiece temperatures likely to be generated may be estimated by the control arrangement using known methods for temperature prediction during grinding processes.

It will be appreciated by a person skilled in the art that the cut depth is the depth of material to be removed from the perimeter of the workpiece by incremental movement of the tool and workpiece towards each other during the machining process. In a preferred approach, the maximum cut depth is calculated with reference to the desired finished profile of the workpiece.

This maximum cut depth may be used for each incremental cut (or a plurality of the incremental cuts) made during machining of the workpiece.

In order to translate the cut depth into control signals for the drive mechanism when the tool is a grinding wheel, it will be appreciated that the control arrangement will need to make adjustments having regard to the radius of the grinding wheel and changes in the profile of the workpiece as the machining operation progresses, as the contact point between the wheel and the workpiece will oscillate relative to the rotational axis of the wheel during a machining operation.

In further examples, a cut depth value may be calculated by the evolutionary algorithm. A predetermined cut depth may be specified initially to "seed" the algorithm. The control arrangement may determine a calculated cut depth using the evolutionary algorithm which combines with a calculated workpiece velocity profile to provide a machining operation which is predicted by the control arrangement to be within one or more predetermined limits of the machining process, such as a maximum specific material removal rate and/or a maximum workpiece temperature.

In preferred examples, the control arrangement may calculate using the evolutionary algorithm variations to be made to the cut depth during the course of a machining operation.

In a preferred example, the machine tool is a grinding machine and the tool mount is for carrying a grinding wheel.

The present disclosure also provides a method of machining a workpiece using a machine tool comprising a tool mount for carrying a tool, a workpiece mount for carrying and rotating a workpiece about an axis of rotation, a drive mechanism for moving at least one of the tool mount and the workpiece mount relative to the other, and a control arrangement for controlling the workpiece mount and the drive mechanism, wherein the method comprises the steps of:
  receiving input data in the control arrangement, the input data defining a profile to be machined onto the workpiece, with the profile being defined in a plane perpendicular to the axis of rotation and non-circular in that plane;
  calculating with the control arrangement using an evolutionary algorithm a workpiece velocity profile corresponding to the velocities at which the workpiece is to be rotated by the workpiece mount over at least a part of a rotation of the workpiece during machining of the workpiece by a tool mounted in the tool mount; and
  rotating a workpiece with the workpiece mount according to the workpiece velocity profile during machining of the workpiece by a tool mounted in the tool mount.

In addition, the present disclosure provides a method of generating a workpiece velocity profile for use by a machine tool comprising a tool mount for carrying a tool, a workpiece mount for carrying and rotating a workpiece about an axis of rotation, a drive mechanism for moving at least one of the tool mount and the workpiece mount relative to the other, and a control arrangement for controlling the workpiece mount and the drive mechanism, wherein the method comprises the steps of:
  receiving input data in a processing arrangement, the input data defining a profile to be machined onto the workpiece, with the profile being defined in a plane perpendicular to the axis of rotation and non-circular in that plane;
  calculating with the processing arrangement using an evolutionary algorithm a workpiece velocity profile corresponding to the velocities at which the workpiece is to be rotated by the workpiece mount over at least part of a rotation of the workpiece during machining of the workpiece by a tool mounted in the tool mount; and
  outputting from the processing arrangement the calculated workpiece velocity profile for use by the control arrangement of the machine tool.

The calculated workpiece velocity profile may then be inputted into the control arrangement of the machine tool, causing the machine tool to machine the desired profile onto the workpiece.

BRIEF DESCRIPTION OF THE DRAWINGS

Examples according to the present disclosure will now be described by way of example and with reference to the accompanying schematic drawings, wherein.

DETAILED DESCRIPTION OF THE DRAWINGS

Figure 1:
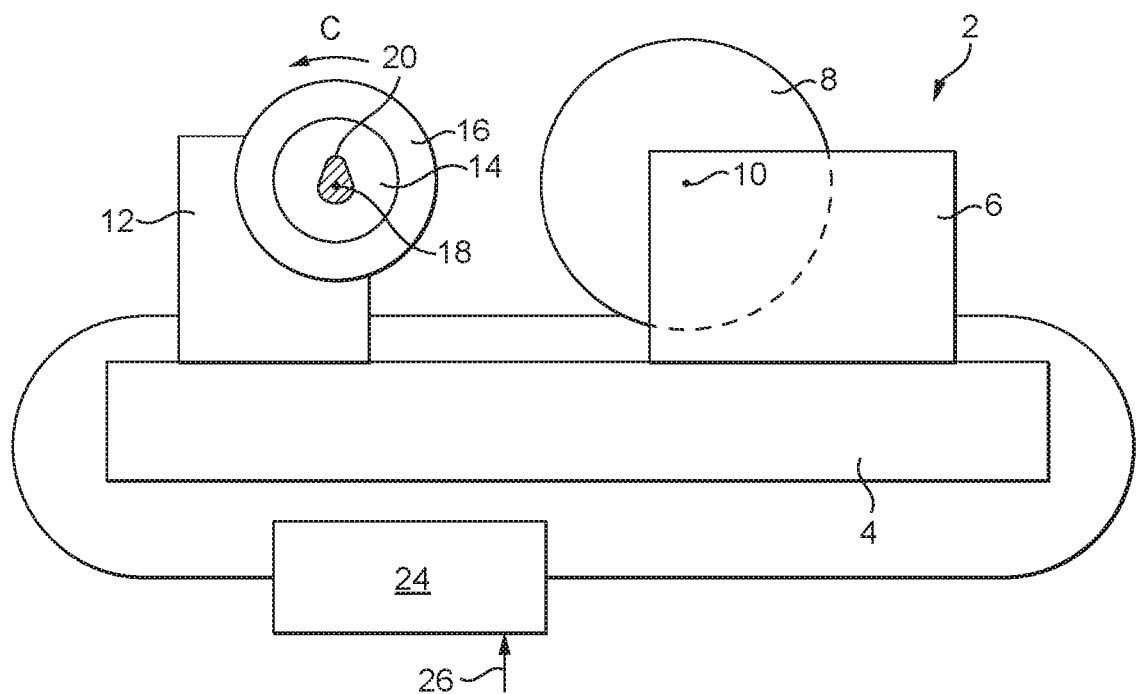
FIG. 1 is a side view of a machine tool according to the present disclosure.
Figure 2:
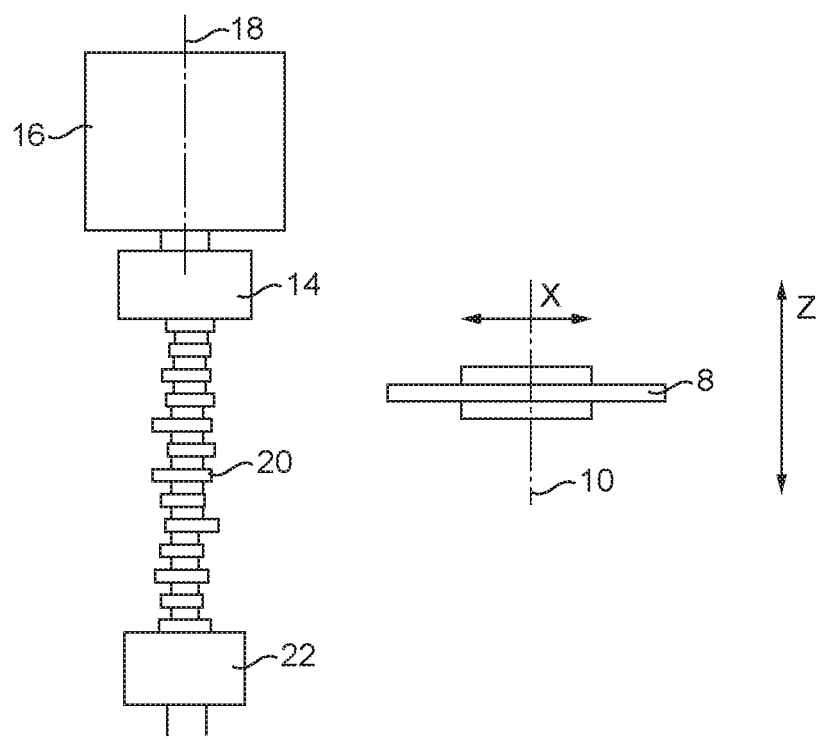
FIG. 2 is a plan view of parts of the machine tool of FIG. 1.

An example of a machine tool according to the present disclosure in shown in FIGS. 1 and 2. The machine tool 2 has a machine bed 4. The machine bed carries a tool mount in the form of a wheelhead 6. This includes a drive spindle for rotating a grinding wheel 8 about an axis of rotation 10. A drive mechanism (not shown) is provided for moving the wheelhead 6 along a linear machine axis parallel to the reference axis X.

A headstock 12 is also carried by the machine bed 4. A workpiece mount 14 is carried by a drive spindle 16 which is in turn mounted on the headstock 12. The drive spindle 16 is operable to rotate the workpiece mount 14 about an axis of rotation 18 in a direction C. Axis 18 is perpendicular to linear reference axis X. A workpiece 20 is supported by the workpiece mount 14 and a tailstock 22.

The machine tool includes a control arrangement 24 which is communicatively coupled to the tool mount drive spindle, the workpiece mount drive spindle and the drive mechanism for moving the wheelhead. The control arrangement has an input 26 for input data defining a profile to be machined on a workpiece. The control arrangement also includes a processor and memory. The processor serves to run instructions loaded into the memory and receive data via input 26. The processor may be a number of processors, a multi-processor core, or some other type of processor, depending on the particular implementation. The memory is any piece of hardware that is capable of storing information, such as, for example, without limitation, data, program code in functional form, and other suitable information either on a temporary basis or a permanent basis. The memory may be, for example, a random access memory or any other suitable volatile or non-volatile storage device.

In operation of the machine tool, the grinding wheel 8 is fed in towards the workpiece along direction X. It will be appreciated that relative movement between the workpiece and the grinding wheel along direction X may also be achieved by moving headstock 12 and tailstock 22 relative to the machine bed in addition to or instead of movement of the tool mount 6. The grinding wheel is also moveable relative to the workpiece along a machine axis parallel to the reference axis Z, perpendicular to the reference axis X. Again, this relative motion may instead, or additionally, be achieved by movement of the headstock 12 and tailstock 22 along a machine axis parallel to the reference axis Z relative to the machine bed.

Figure 3:
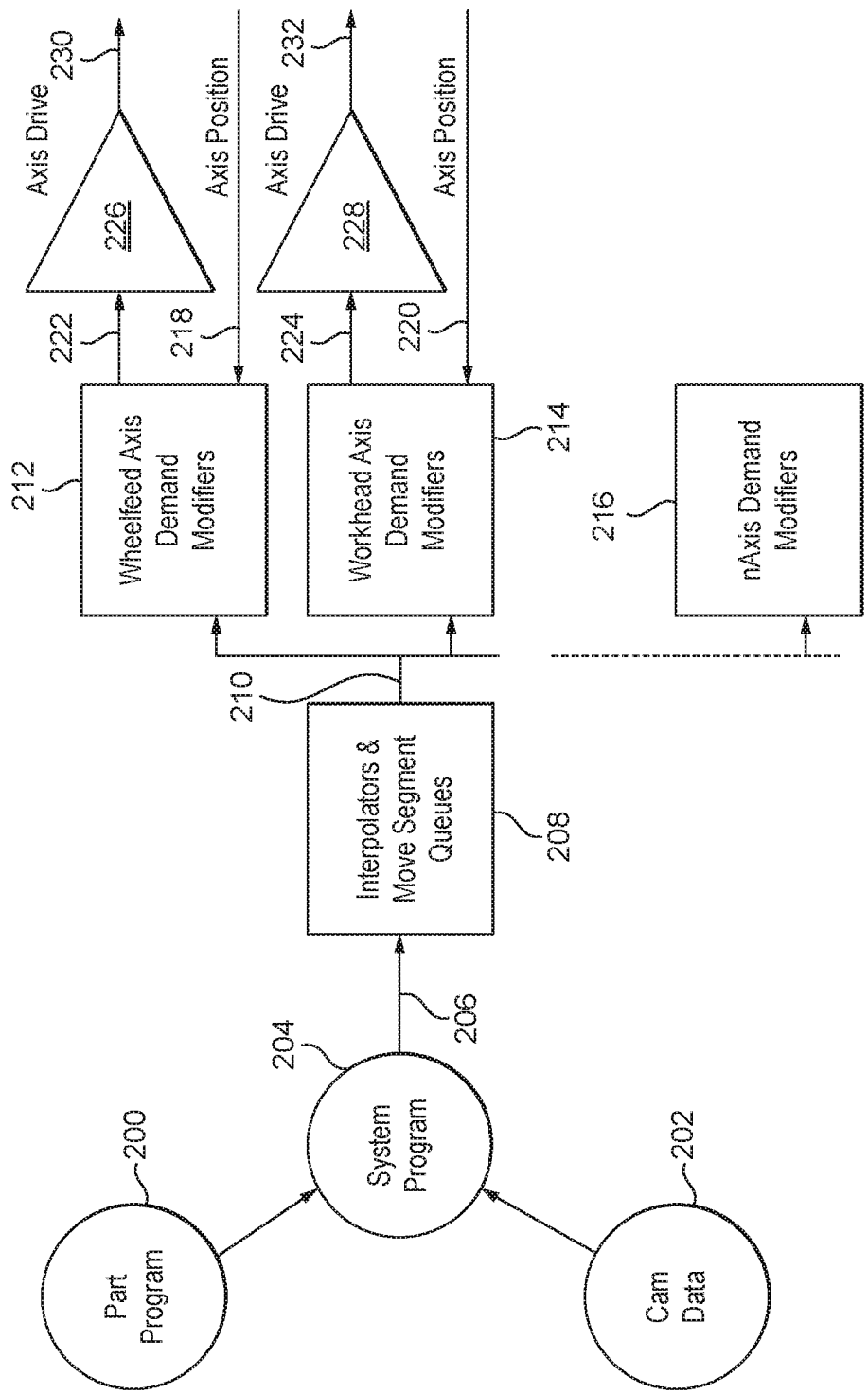
FIG. 3 is a block diagram showing components of a control arrangement of the machine tool of FIGS. 1 and 2.

FIG. 3 is a block diagram showing components of a control arrangement 24 of the machine tool shown in FIGS. 1 and 2. Item 200 represents a "part program". This includes details of the workpiece to be machined, such as the locations of different features on the workpiece. Item 202 represents "cam data". This provides information about a cam in this example which is to be machined at a particular location on the workpiece.

A system program 204 receives the part program and cam data. In response, it generates a workpiece velocity profile calculated using the techniques described herein. It then generates command and control signals along line 206 which are inputted to interpolators and move segment queues 208. The interpolators generate demand instructions for synchronised motion of axis drives of the machine tool. These instructions are fed into the move segment queues ready to supply via output line 210 to respective demand modifiers 212, 214 (and one or more others represented by an "nth" demand modifier 216). The demand instructions are modified by the modifiers 212, 214 in response to signals along lines 218 and 220 which are indicative of the actual positions of the respective machine axes. In response, the modifiers generate axis commands along lines 222 and 224, respectively. The axis commands are fed along lines 222 and 224 to respective axis drives 226 and 228. The axis drive outputs 230 and 232 are connected directly to respective axis actuators (not shown) which propel the associated machine axes under the command of the associated demand modifiers.

Figure 4:
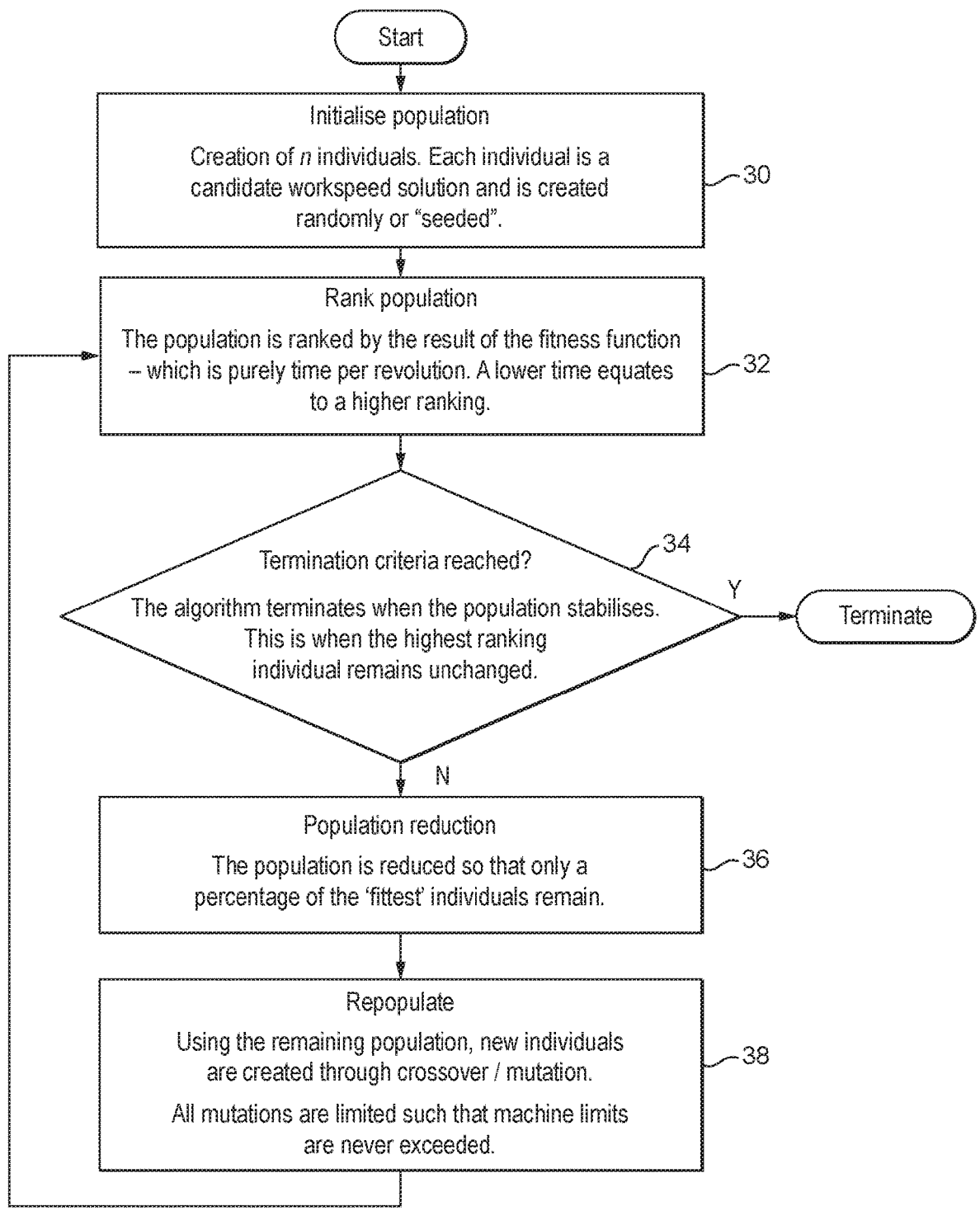
FIG. 4 is a flow diagram representing steps of an evolutionary algorithm for use in the present disclosure.

According to the present disclosure, a machine tool is configured to calculate a workpiece velocity profile using an evolutionary algorithm. Evolutionary algorithms are well known in the field of artificial intelligence. Genetic algorithms belong to the larger class of evolutionary algorithms. Steps in the application of an evolutionary algorithm to a machining process according to an example of the present disclosure are set out in a flowchart in FIG. 4.

In a first step 30, an initial population of candidate workpiece velocity profiles is generated with reference to the profile to be machined on the workpiece. Each candidate solution is created randomly or "seeded". Each candidate is checked to see if it is within the boundaries of a predetermined search space. The boundaries of the search space may be dictated by operational limitations of a given machine tool. For example, there may be maximum values associated with one or more of the workpiece rotational velocity, acceleration and jerk, and the velocity, acceleration and jerk of relative movement of the tool mount and the workpiece mount by the drive mechanism of the machine tool.

Each candidate solution is then ranked against the others in step 32. This may be determined by evaluating each candidate solution using one or more predetermined criteria to assist the relative "fitness" of the candidate solution. One such criterion may be the time taken for a workpiece to complete one revolution when rotated in accordance with the candidate velocity profile.

The top ranking solution is then tested in step 34 to see if it is unchanged from the top ranking solution generated during the preceding iteration of the algorithm. If so, then the algorithm is terminated. If not, then a further population of candidate solutions is created in steps 36 and 38.

Alternatively, the top ranking solution may be tested to see if it fulfils one or more predetermined requirements for the workpiece velocity profile. If this is not the case, step 34 may also check to see if a time limit for execution of the evolutionary algorithm has been exceeded. If so, then the algorithm is terminated. If not, then a further population of candidate solutions is created in steps 36 and 38.

In step 36, the best (or fittest) of the previously ranked solutions are retained. A new population is then generated using evolutionary techniques in step 38 and then the process again moves onto the ranking step 32.

Figure 5:
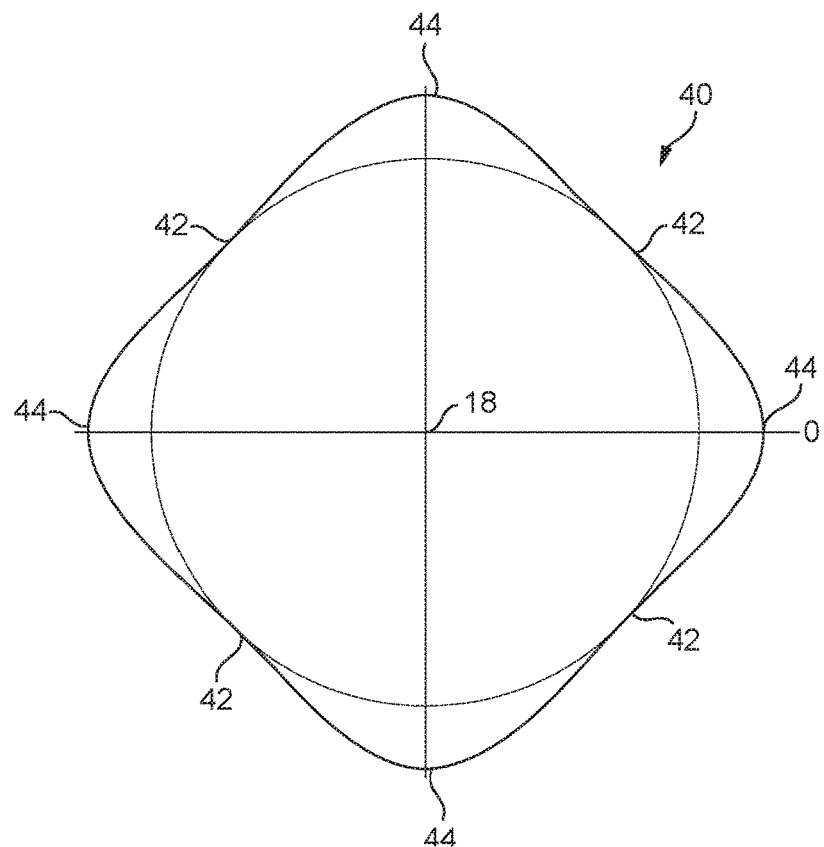
FIGS. 5, 8 and 11 show examples of non-circular workpiece profiles.
Figure 8:
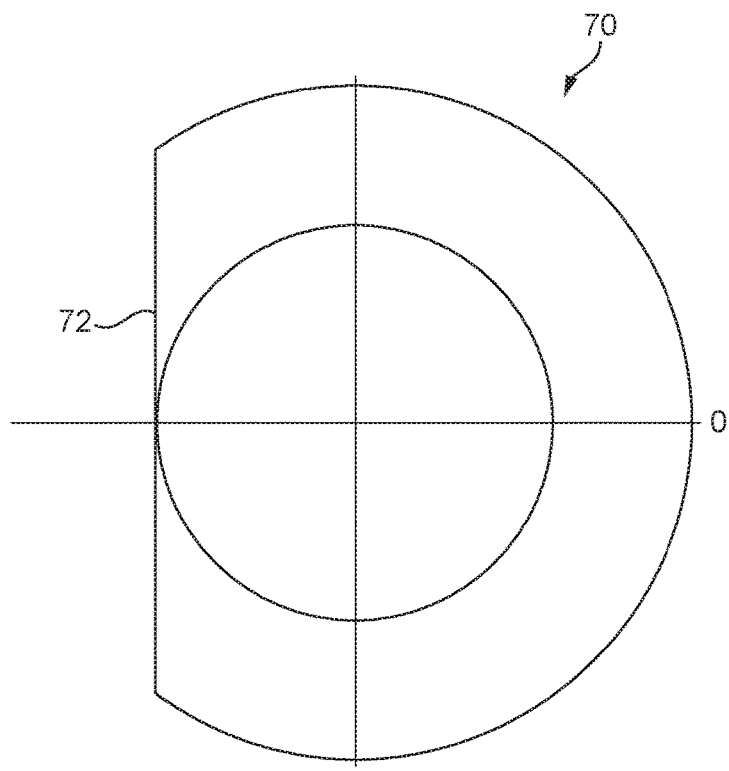
Figure 11:
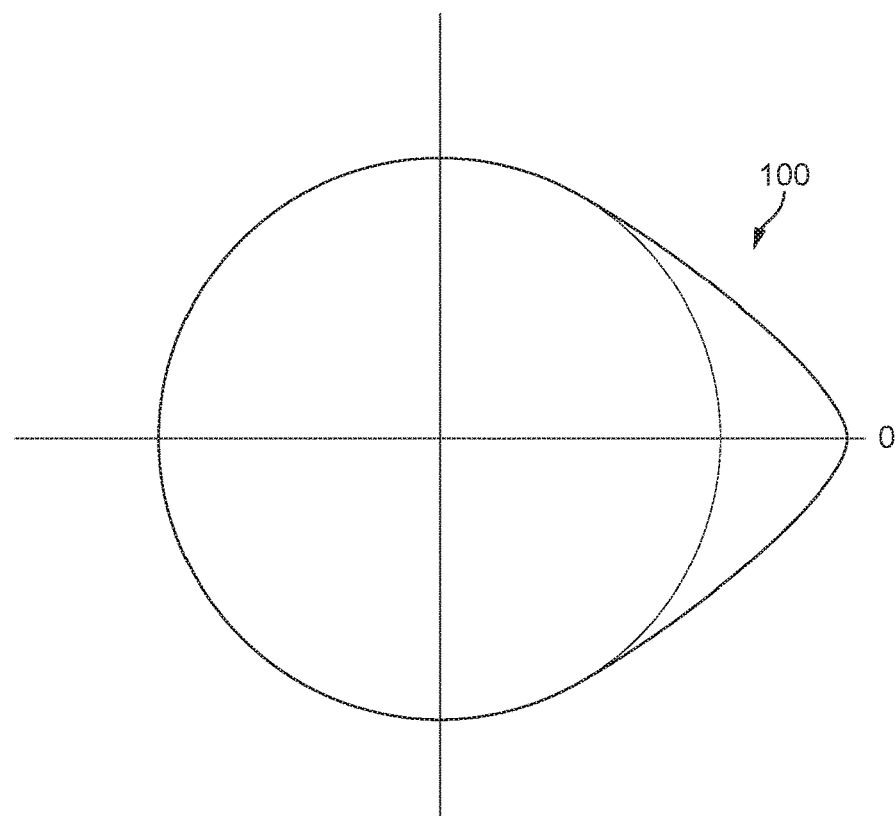

By way of illustration, three cam profile examples are shown in FIGS. 5, 8 and 11 and (a) a velocity profile generated using a known methodology and (b) a velocity profile generated according to an example of the present disclosure are then shown for comparison.

Each cam profile is drawn in FIGS. 5, 8 and 11 as a polar plot to show the non-circular cross-sectional profile of the cam in a plane perpendicular to its axis of rotation in the machine tool. According to the present disclosure, a machine tool calculates in-feed positions with respect to the workpiece rotational position for grinding the cam profile with a grinding wheel. To do so, the machine tool is provided with data defining the cam profile, the grinding wheel diameter and machine geometry parameters to enable it to determine the wheelhead to workpiece spacing.

Figure 6:
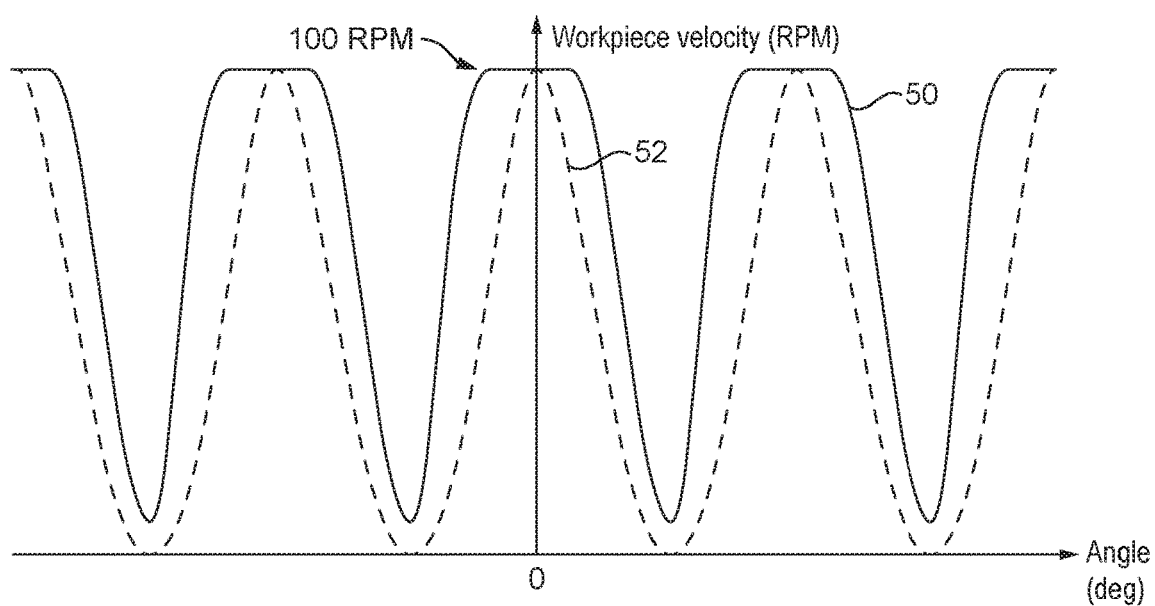
FIGS. 6, 9 and 12 show workpiece velocity profiles for use in machining the profiles of FIGS. 5, 8 and 11, respectively, which have been calculated using known techniques.

FIG. 6 shows a velocity profile for grinding of the cam shape 40 shown in FIG. 5 using an existing approach of reducing the speed of rotation of the workpiece during grinding of the flank regions 42 between the four cam lobes 44. Plot 50 is a velocity profile generated by plotting the workpiece velocity against angle of rotation of the workpiece about its central longitudinal axis 18, with zero corresponding to the 3 o'clock position on the polar plot of FIG. 5. Also shown for reference is a (dashed line) plot 52 of the cam surface lift against workpiece angle for the point on the cam surface facing the grinding wheel, in the plane including the workpiece axis 18.

Figure 7:
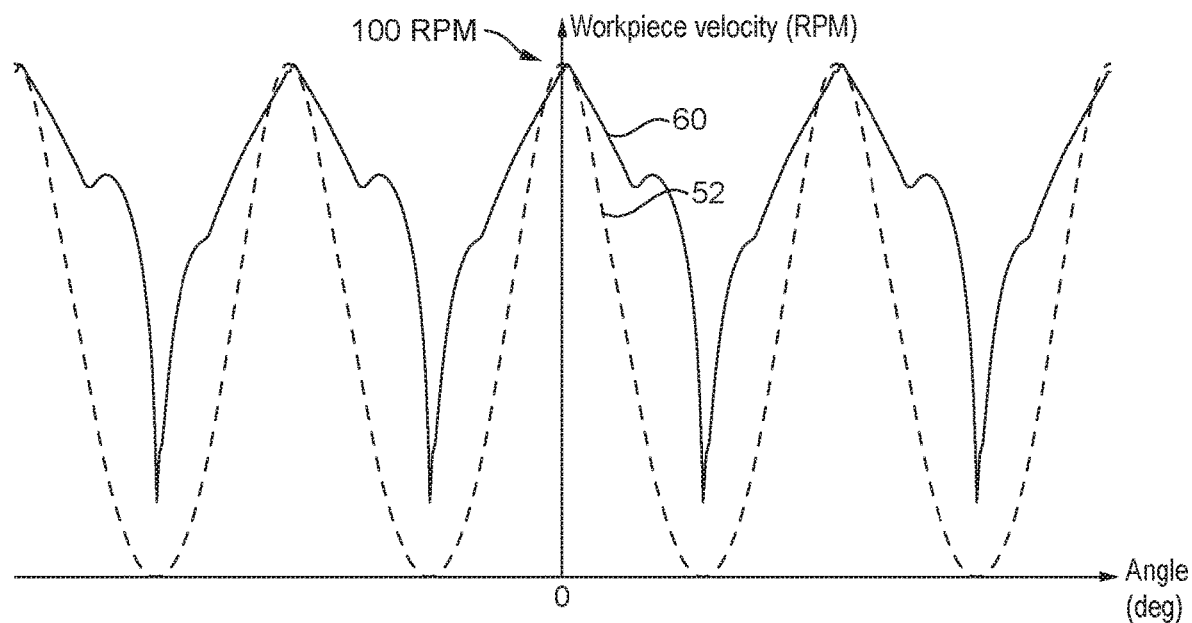
FIGS. 7, 10 and 13 show workpiece velocity profiles for use in machining the profiles of FIGS. 5, 8 and 11, respectively, which have been calculated according to the present disclosure.

A workpiece velocity profile 60 for machining the cam profile shown in FIG. 5 which has been generated according to an example of the present disclosure is shown in FIG. 7.

In both velocity profiles 50 and 60, the peak workpiece velocity is close to 100 RPM. However, the overall time for a revolution of the workpiece is reduced from around 1.7 seconds to around 0.9 seconds without exceeding any machine axis limitations.

Two further examples of cycle time reduction using examples of the present disclosure are shown in FIGS. 8 to 13.

Figure 9:
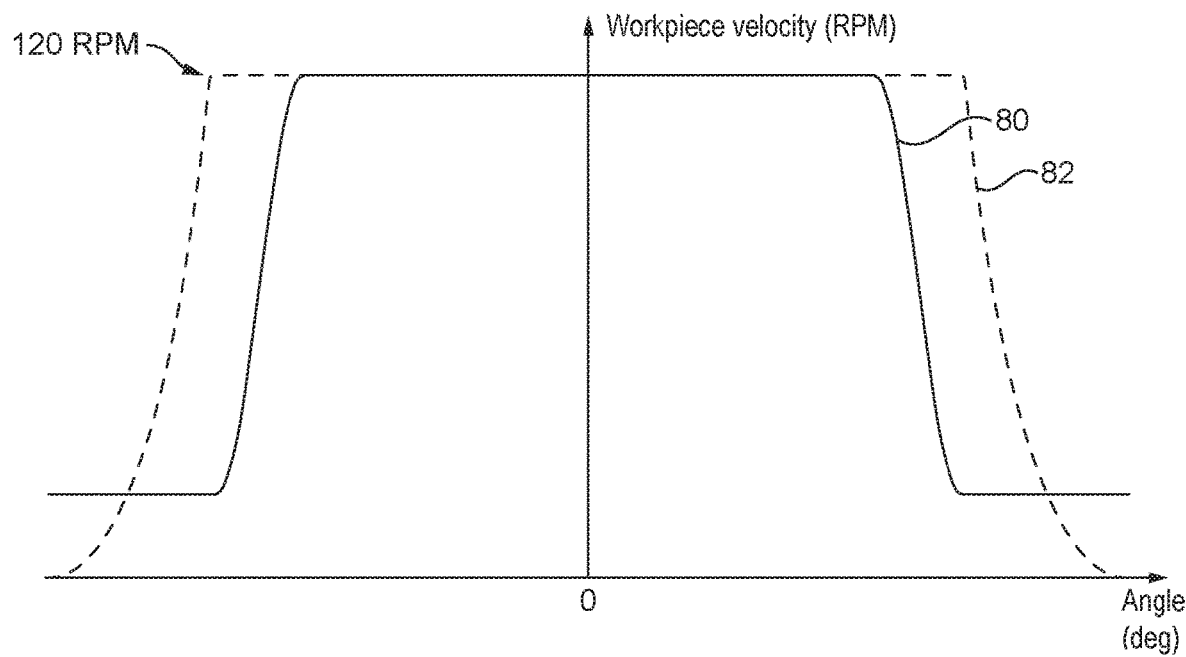

The cam profile example of FIG. 8 is a straight-sided cam 70. The profile is circular apart from a linear flank 72. A velocity profile 80 generated using an existing approach is shown in FIG. 9 along with a plot 82 of the cam lift. A velocity profile 90 generated using an example of the present disclosure is shown in FIG. 10.

Figure 10:
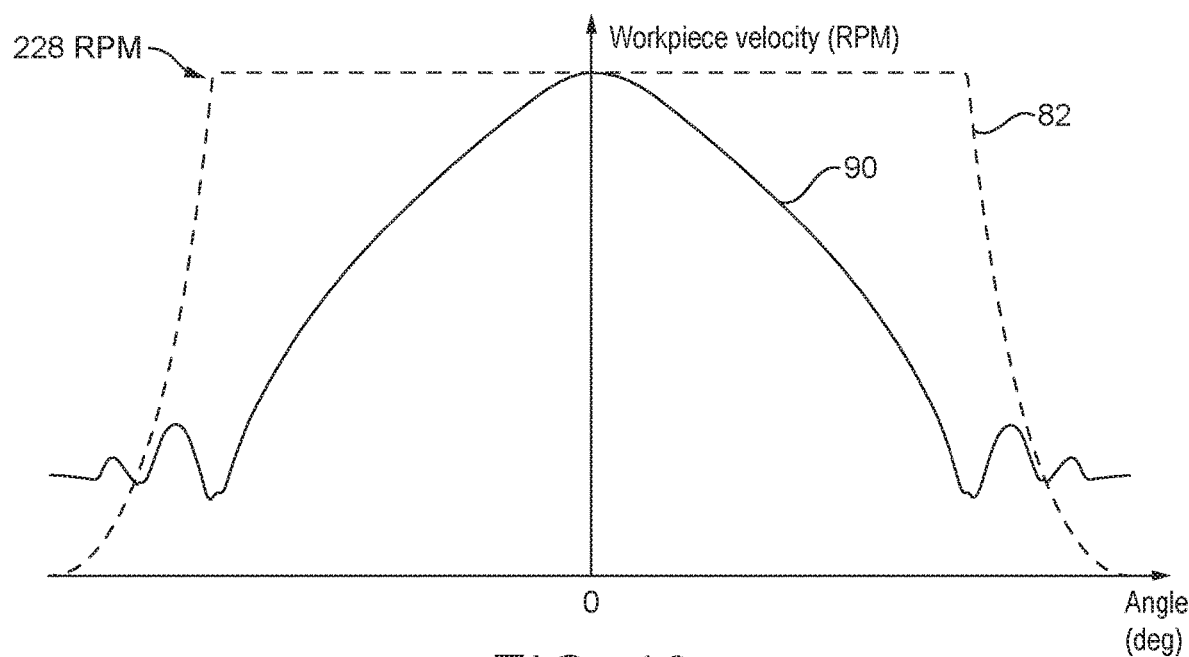

In the profile 80 of FIG. 9, the maximum workpiece rotational velocity is 120 RPM, and this is increased to 228 RPM in plot 90 of FIG. 10. The time per workpiece revolution in FIG. 9 plot 80 is around 1.4 seconds which is reduced to around 0.7 seconds in the profile of FIG. 10.

Figure 12:
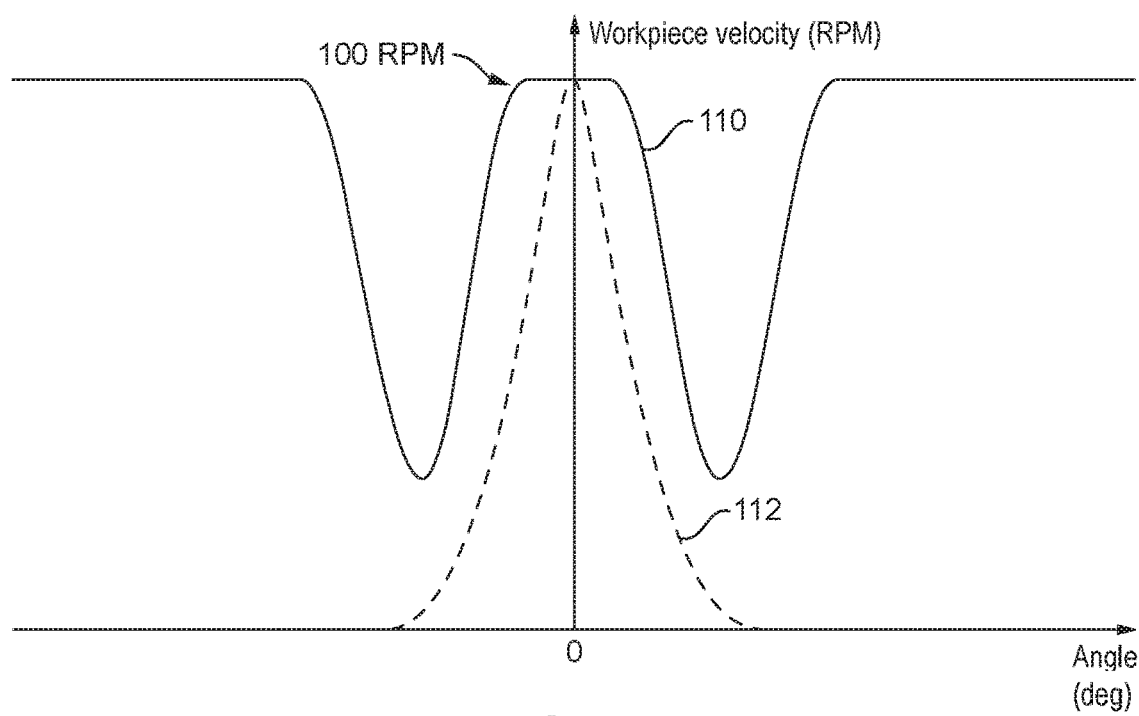
Figure 13:
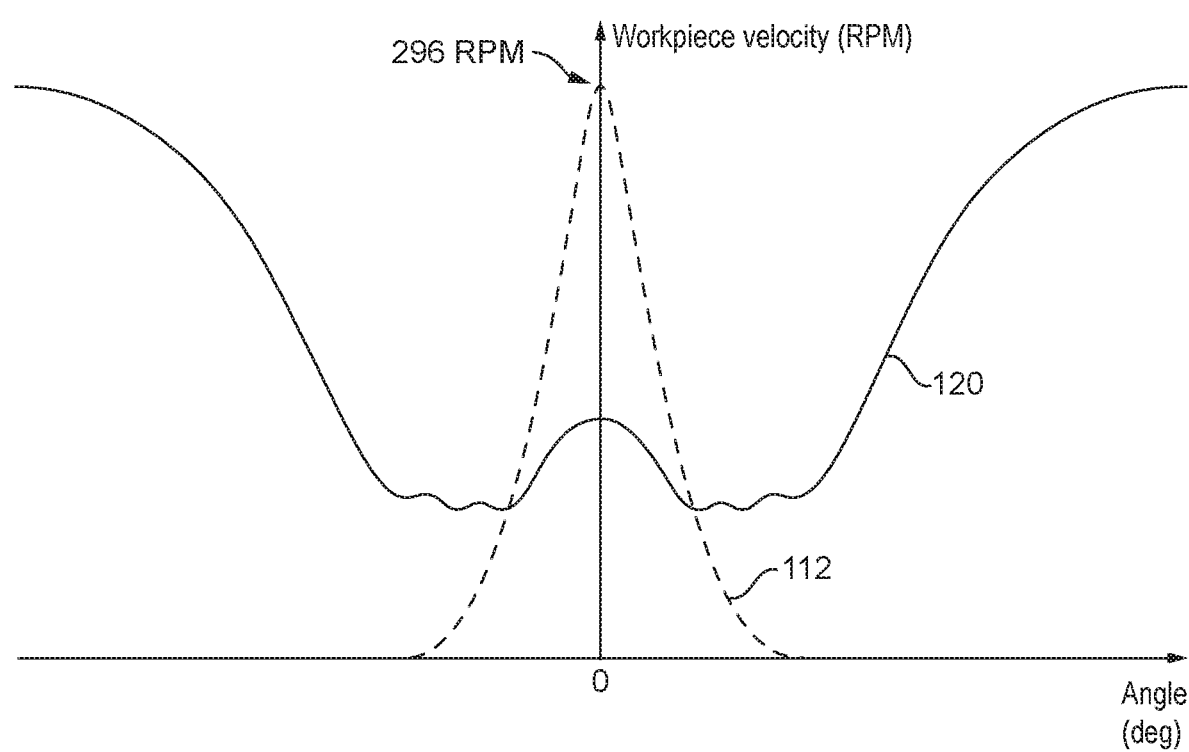

A single lobed cam example 100 is shown in FIG. 11. A workpiece velocity profile 110 is shown in FIG. 12 which has been generated using an existing approach. FIG. 12 also includes the associated cam lift profile 112. A velocity profile 120 generated according to an example of the present disclosure is shown in FIG. 13.

The maximum workpiece velocity achieved according to the profile of FIG. 12 is 100 RPM. This increases to 296 RPM in the profile of FIG. 13. The time per revolution of the workpiece according to the FIG. 12 approach is around 0.8 seconds. According to the profile of FIG. 13, this has been reduced to around 0.43 seconds.

Although the embodiments according to the present disclosure described with reference to the drawings comprise processes performed by a control arrangement, the present disclosure also extends to computer programs comprising instructions for causing a control arrangement or a computer to perform the processes. More particularly, computer programs on or in a transitory or non-transitory recording medium, adapted for putting the disclosure into practice are encompassed by the present disclosure. The program may be in the form of source code, object code, a code intermediate source and object code such as in partially compiled form, or in any other form suitable for use in the implementation of the processes according to the present disclosure. The recording medium may be any entity or device capable of carrying the program.

For example, the recording medium may comprise a storage medium, such as a ROM, for example a CD ROM or a semiconductor ROM, or a magnetic recording medium, for example a floppy disc or hard disk. Alternatively, the carrier may be an integrated circuit in which the program is embedded, the integrated circuit being adapted for performing, or for use in the performance of, the relevant processes.

Thus, the present disclosure provides a computer program comprising program instructions for causing a control arrangement to perform the methods described herein. Furthermore it includes provision of such a computer program on a recording medium, embodied in a record medium, stored in a computer electronic memory, or embodied in a read-only electronic memory.

Aspects of the present disclosure may be embodied as a computer method, computer system, or computer program product. Accordingly, aspects of the present disclosure may take the form of an entirely hardware embodiment, an entirely software embodiment (including firmware, resident software, micro-code, and the like), or an embodiment combining software and hardware aspects. Furthermore, aspects of the present disclosure may take the form of a computer program product embodied in a computer-readable medium (or media) having computer readable program code/instructions embodied thereon.

Any flowchart in the drawings is intended to illustrate the architecture, functionality, and/or operation of possible implementations of systems, methods, and computer program products according to aspects of the present disclosure. In this regard, each block may represent a module, segment, or portion of code, which comprises one or more executable instructions for implementing the specified logical function(s). In some implementations, the functions noted in the block may occur out of the order noted in the drawings. For example, two blocks shown in succession may, in fact, be executed substantially concurrently, or the blocks may sometimes be executed in the reverse order, depending upon the functionality involved. Each block and/or combination of blocks may be implemented by special purpose hardware-based systems (or combinations of special purpose hardware and computer instructions) that perform the specified functions or acts.

It will be appreciated that references herein to perpendicular or parallel relative orientations and the like are to be interpreted as defining substantially perpendicular or parallel relationships between components within practical tolerances.

The term "machine axis" denotes a physical machine axis herein, as opposed to a reference axis. Each machine axis has two portions which are driven in use to move relative to each other, about or along a reference axis, by associated drive arrangements governed by the control arrangement of the machine tool.

The invention claimed is:

1. A machine tool for machining a workpiece, the machine tool comprising:
   a tool mount for carrying a tool;
   a workpiece mount for carrying and rotating the workpiece about an axis of rotation;
   a drive mechanism for moving at least one of the tool mount and the workpiece mount relative to the other; and
   a control arrangement for controlling the workpiece mount and the drive mechanism, wherein the machine tool is configured to:
      receive input data in the control arrangement, the input data defining a machining profile to be machined onto the workpiece, with the machining profile being defined in a plane perpendicular to the axis of rotation and non-circular in that plane;
      calculate with the control arrangement a workpiece velocity profile corresponding to velocities at which the workpiece is to be rotated by the workpiece mount over a rotation of the workpiece during machining of the workpiece by a tool mounted in the tool mount, wherein an entirety of the workpiece velocity profile is generated only by an evolutionary algorithm; and
      rotate the workpiece with the workpiece mount according to the workpiece velocity profile during machining of the workpiece by the tool mounted in the tool mount.

2. The machine tool of claim 1, wherein the evolutionary algorithm is a genetic algorithm.

3. The machine tool of claim 1, wherein, when executed, the evolutionary algorithm generates a population of candidate workpiece velocity profiles and a fitness of each candidate workpiece velocity profile is determined by the control arrangement with reference to a duration of a rotation of the workpiece according to the respective candidate workpiece velocity profile.

4. The machine tool of claim 1, wherein, when executed, the evolutionary algorithm generates a population of candidate workpiece velocity profiles and a candidate workpiece velocity profile is rejected by the control arrangement if it exceeds a threshold maximum value for at least one of the following machine operating parameters: workpiece rotation velocity, acceleration and jerk; and velocity, acceleration and jerk of relative movement of the tool mount and the workpiece mount by the drive mechanism.

5. The machine tool of claim 1, wherein the machine tool is configured to randomly generate an initial population of candidate workpiece velocity profiles.

6. The machine tool of claim 1, wherein the evolutionary algorithm is seeded with a predetermined workpiece rotation velocity value.

7. The machine tool of claim 1, wherein the evolutionary algorithm is seeded with a predetermined workpiece rotation velocity profile.

8. The machine tool of claim 1, wherein, when executed, the evolutionary algorithm generates a population of candidate workpiece velocity profiles, with each candidate workpiece velocity profile comprising a sequence of velocity values representing rotational velocities, and the difference between each velocity value and the adjacent velocity values in the sequence being restricted by the control arrangement to be within a predetermined range.

9. The machine tool of claim 1, wherein the evolutionary algorithm generates a velocity profile corresponding to velocities of relative movement of the tool mount and the workpiece mount by the drive mechanism in association with each of a population of candidate workpiece velocity profiles.

10. The machine tool of claim 1, wherein, after a workpiece velocity profile has been calculated, the control arrangement is configured to calculate a maximum cut depth which provides specific material removal rates which are less than or equal to a predetermined maximum specific material removal rate over the calculated workpiece velocity profile.

11. The machine tool of claim 1, wherein, after a workpiece velocity profile has been calculated, the control arrangement is configured to calculate a maximum cut depth which is determined by the control arrangement to generate workpiece temperatures less than or equal to a predetermined maximum workpiece temperature over the calculated workpiece velocity profile.

12. The machine tool of claim 1, wherein the machine tool is a grinding machine and the tool mount is for carrying a grinding wheel.

13. A method of machining a workpiece using the machine tool of claim 1, wherein the method comprises the steps of:
   receiving the input data in the control arrangement of the machine tool of claim 1;
   calculating with the control arrangement using only the evolutionary algorithm an entirety of the workpiece velocity profile; and
   rotating the workpiece with the workpiece mount according to the workpiece velocity profile during machining of the workpiece by the tool mounted in the tool mount.

14. A non-transitory computer-readable medium storing computer executable instructions for causing a control arrangement to control a machine tool to perform the method of claim 13.

* * * * *